Sept. 1, 1959 E. WEISSHAAR 2,902,660

ELECTRIC MODULATING DEVICES

Filed Jan. 26, 1955

United States Patent Office 2,902,660

Patented Sept. 1, 1959

2,902,660

ELECTRIC MODULATING DEVICES

Erich Weisshaar, Erlangen, Germany, assignor to Siemens-Schuckertwerke Aktiengesellschaft, Berlin-Siemensstadt, Germany, a German corporation Application January 26, 1955, Serial No. 484,192

Claims priority, application Germany February 4, 1954

6 Claims. (Cl. 332—51)

My invention relates to electric devices for superimposing upon the wave of an alternating voltage or current a modulation in dependence upon a variable input magnitude. More particularly, my invention relates to modulators wherein the modulating effect is produced by a variation in electric behavior of a semiconductor in response to a magnetic field to which the semiconductor is subjected.

It has been proposed to utilize for such purposes the magnetically responsive resistance variation and the Hall effect occurring in bismuth; and it has also been attempted to obtain modulation by applying the Hall effect of germanium. None of the past proposals, however, has found practical application because of the extremely slight efficiency heretofore attainable with such devices. For example, when using germanium in magnetic fields of 10,000 gauss an operating efficiency of only 5% can be attained. That is, only about 5% of the electrical energy applied to the modulator can be recovered as modulated output energy.

It is an object of my invention to provide a modulator of the semiconductor type that secures an efficiency far beyond the limits heretofore attained.

Another object of my invention is to devise a modulator, particularly for converting variable direct-current voltage into modulated alternating current, which has a power output of such a high magnitude as to permit reducing the required number of amplifying stages or to connect the modulator directly to a power amplifier, oscillograph or device requiring an appreciable current consumption in its input circuit.

To achieve these objects, I provide a modulator with a circuit member of semiconductor substance having a minimum carrier mobility of about 6000 $cm.^2/v.$ sec., and connect this member as a resistor in an electric energizing circuit of variable voltage. The semiconductor member is disposed in a variable magnetic field so that the direction of the field lines intersects, or is perpendicular to, the direction of the current flowing through the semiconductor member; and an output circuit is connected with the semiconductor member so that the member supplies the output circuit with an output voltage that corresponds to the magnetic field variation modulated by the varying electric energization of the semiconductor member or vice versa.

According to one of the more specific features of my invention, I dispose a semiconductor member having a carrier mobility of more than 6000 $cm.^2/v.$ sec. in the field of a magnetic device which has a field control winding excited by periodic or alternating current of a desired carrier frequency, and I connect the semiconductor member in the circuit of a direct-current source of variable voltage to provide a modulating frequency, whereby the semiconductor member impresses upon the above-mentioned output circuit an alternating voltage of the carrier frequency modulated in accordance with the modulating frequency.

These and other objects and features of my invention will be apparent from, and will be mentioned in, the following description in conjunction with the embodiments of the invention exemplified by the drawings in which.

Figure 1:
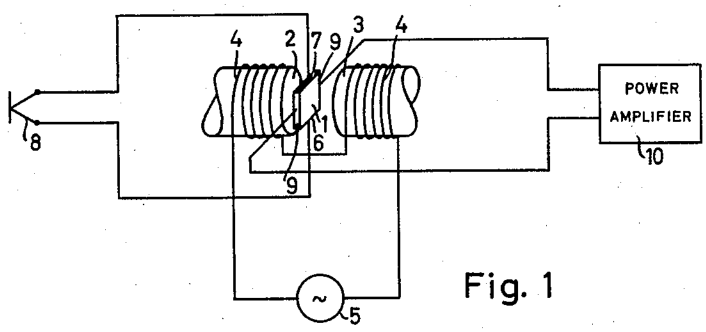
Fig. 1 shows schematically a modulator utilizing the Hall effect occurring in the semiconductor.

The modulator according to Fig. 1 comprises a semiconductor member 1 consisting of a compound of a carrier mobility above 6000 $cm.^2/v.$ sec. The nature and properties of this compound will be described in a later place, and it will here suffice to mention that the member 1 may consist of a single crystal of indium arsenide (InAs) or of indium antimonide (InSb). The member, as shown in Fig. 1, is flat and of rectangular or square shape. Suitable dimensions are 8 to 15 mm. length, 3 to 8 mm. width and 0.1 to 0.5 mm. thickness, for example.

This semiconductor member of high mobility is located between the poles 2, 3 of an electromagnet. For the purpose of lucid illustration, a wide spacing is shown between member 1 and poles 2, 3. Actually, I prefer keeping the gap between the poles as narrow as possible. To this end, each pole face may be covered by a thin coating of electrically insulating material which is in contact with the semiconductor member. I prefer using as such coating a magnetizable ferrite material which, though electrically insulating, is magnetically conductive so that there is no gap between the magnetic structure and the semiconductor member.

The excitation winding 4 of the magnet is energized from an alternating-current source 5 of the desired carrier frequency. The semiconductor member 1 is provided with electrodes or terminals 6 and 7 which are connected in the circuit of a source of variable direct current 8 here consisting of a thermoelement. The modulated output voltage or current is derived from across a pair of Hall electrode points 9 fixed to the semiconductor member 1. The Hall electrodes are connected to input terminals 10 of a power amplifier or other current consuming load.

When the alternating magnetic field produced by source 5 is effective, a pulsating Hall voltage of the same frequency is impressed across terminals 10 as a result of the direct current supplied by the source 8; and since the direct current varies, the output voltage is modulated accordingly.

As will be more fully explained, a modulated power output, per semiconductor member, of milliwatts, or even up to a power in the order of 0.1 watts, can be taken from such a modulator at a Hall voltage in the order of millivolts up to the order of $10^{-1}$ volts. For that reason, and as shown, the modulator output can be directly applied to current amplifiers or other loads requiring an appreciable power or current input, such as electrodynamic oscillographs, magnetic amplifiers, transistor amplifiers, and amplifying dynamos; that is, the pre-amplifiers or the first amplifying stages usually required can be avoided. The high power output of the modulator according to the invention is accompanied by a greatly improved efficiency. For instance, the variable direct voltage generated by a thermoelement as shown at 8 in Fig. 1 is converted into modulated alternating voltage at an efficiency as high as about 30%, when operating with a magnetic field of 10,000 gauss peak value and using a semiconductor member consisting of an indium arsenide crystal having a carrier mobility of about 60,000 cm.²/volt second. As a consequence of high efficiency, the modulator is also distinguished by a favorable signal-to-noise ratio.

Figure 2:
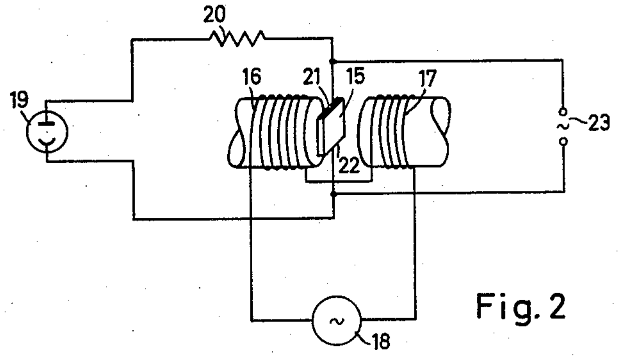
Fig. 2 shows a modulator utilizing the magnetically responsive resistance variation of the semiconductor member.

Fig. 2 shows an analogous arrangement wherein the magnetic-field responsive resistance variation of the semiconductor member is utilized for modulating a direct current. The high-mobility semiconductor member 15 is located in the field of an electromagnet whose winding 16 is energized from a source 18 by alternating current of a given frequency. A direct-current source 19, shown as a photoelectric cell, supplies the modulating input current and is connected through a resistor 20 to the terminals 21 and 22 of member 15. The modulator output circuit, extending between the terminals 23, is connected across the member 15. Under the effect of the alternating magnetic field, the resistance of the semiconductor 15 is periodically varied so that a periodically alternating voltage drop is produced across its terminals 21 and 22. In this case, contrary to the example given in Fig. 1, the frequency of the modulated output current or voltage is twice the frequency of the alternating field excitation. As regards output energy and efficiency, the results obtained with modulators on the resistance principle are as favorable as those exemplified above with reference to Fig. 1.

As mentioned, the high efficiency and high power output of modulators according to my invention is predicated upon the use of semiconductor members of a carrier mobility above 6000 cm.²/v. sec. That is, if the mobility is considerably below that, the magnetically responsive phenomena are too slight and too little distinct from noise phenomena to afford useful application. At mobility values of 6000 and more, preferably 10,000 or even higher, the magnetically responsive changes in the electrical characteristics of the semiconductor members have appreciable and readily utilizable magnitudes as will be explained presently.

"Carrier mobility" is defined as the velocity of the electric charge carriers within the semiconductive substance in centimeters per second in an electric field of one volt per centimeter. One and the same semiconductor substance may exhibit (n-type) conductance by excess electrons or negative carriers, or (p-type) conductance by defect-electrons (holes) or positive carriers, depending upon the preparative treatment applied to the substance. The type of conductance depends particularly on the choice of small traces of substitutional impurities that are added to, or contained in, the substance and cause lattice defects, i.e. disturb the perfection of the valance-bond structure. The term "carrier mobility" or "mobility" as used herein is generic to both types of conductance, it being only essential that either the electron mobility or the hole mobility of the semiconductor substance be above the above-mentioned minimum value.

For any given conditions of magnetic field strength, power supply in the electric circuit of the semiconductor, geometric shape and dimensions, and charge-carrier concentration, the magnetic effect upon the electrical characteristics increases with the carrier mobility of the particular semiconductor substance.

When, in a semiconductor, an electron carrying an electric charge and having a carrier mobility $\mu$ is subjected to an electric field E as produced by the flow of current through the semiconductor, then the electron is subject to the force $K_{el}=eE$. Under the effect of this force, the electron moves at a velocity $v=\mu E$. If this electron is also subjected to a magnetic field H directed perpendicularly to the electric field, then an additional force is imposed upon the electron perpendicularly to its original direction of motion. This additional force has the magnitude $$K_{magn}=evH=e\mu EH$$

The ratio of the two forces $K_{magn}/K_{el}$ becomes equal to $\mu$H if $$K_{magn}/K_{el}=\mu H\ 1$$

That is, as long as the value $\mu$H is of a smaller order of magnitude than unity, the magnetic effect upon the electric properties of the semiconductor is slight and negligible. On the other hand, this effect becomes appreciable if $$K_{magn}/K_{el}=\mu H\ 1$$

that is, when the magnetic force is of the same order of magnitude as the electric force so that the value $\mu$H is approximately equal to unity.

Consequently, the value $\mu H=1$ may be taken as an approximate limit for the occurrence of appreciable magnetic effects. The magnetic field in the foregoing consideration is measured in volt second/cm.² and the mobility in cm.²/v. sec.

Now, the magnetic field strengths readily obtainable with electromagnets are up to about 17,000 gauss while, because of the saturation properties of iron, field strengths larger than 17,000 gauss can be produced only with difficulty. It follows that for securing magnetic effects of utilizable magnitude, the semiconductor must have a minimum mobility of about 6000 cm.²/v. sec., because 17,000 gauss is equal to $1.7\cdot10^{-4}$ volt second/cm.², so that $$\mu H=6000\times1.7\times10^{-4}=1$$

The peak value of an alternating magnetic field as obtaining in modulators according to Figs. 1 and 2, for practical and economical reasons, is preferably kept below 17,000 gauss. For instance, a well applicable peak value of magnetic field strength is approximately 10,000 guass. This requires a carrier mobility of about 10,000 cm.²/v. sec., because $$\mu H=10,000\times10^{-4}=1$$

and it will be recognized that generally a mobility value higher than 10,000 should be available.

The elementary semiconductor substances heretofore used for transistors, namely silicon and germanium, do not have such a high carrier mobility, the best obtainable mobility, namely that of germanium, being about 3,000 cm.²/v. sec. However, the required high carrier mobilities are available with semiconductive compounds.

A compound, in contrast to a homopolar element, has, aside from its homopolar component, also a heteropolar component due to the chemical difference in the lattice elements. The superposition of homopolar and heteropolar components results in an increase in bonding energy due to the so-called resonance strengthening. This has a favorable effect upon the carrier mobility in all those cases in which the heteropolar component of a compound is so weak that its detrimental influence upon the electron mobility is not yet noticeable while at the same time the strengthening of the bond by the resonance between the homopolar and heteropolar components is appreciable.

The foregoing applies especially to binary compounds of the type $A_{III}B_V$, that is to compounds of an element of the third group in the periodic system with an element of the fifth group. Such compounds are described in the copending application of H. Welker for Semiconductor Devices and Methods of Their Manufacture, Serial No. 275,785 now Patent No. 2,798,989, filed March 10, 1952, and assigned to the assignee of the present invention. The compounds of the $A_{III}B_V$ type comprise those of an element selected from boron, aluminum, gallium and indium with an element selected from nitrogen phosphorus, arsenic and antimony. Examples of such compounds are AlN, AlP, AlAs, AlSb, GaN, GaP, GaAs, GaSb, InP, InAs, InSb, Bp. The semiconductor bodies made of these compounds may contain extremely slight traces of substitutional impurities. As a rule, for instance, a trace of tellurium or selenium produces n-type conductance, and a trace of cadmium, zinc or magnesium produces p-type conductance in $A_{III}B_V$ compounds. Especially notable among these compounds are InSb and InAs, both having carrier mobilities far above 20,000 $cm.^2/v.$ sec.

It may happen that the Hall voltage generated in a semiconductor member and according to the invention is lower than the Hall voltage of a germanium body under comparable circumstances. Nevertheless, the Hall-voltage generating modulators according to the invention can deliver a higher power output at a better efficiency because their internal resistance is smaller.

The degree of change in resistance caused in a semiconductor by the effect of a magnetic field depends to some extent on the geometric shape and orientation of the semiconductor member. Especially favorable are semiconductor members that have a large Corbino effect, that is members of substantially circular shape which are equipped with a peripheral terminal electrode and a centrally located point electrode. A modulator of this kind is shown in Figs. 3 and 4.

Figure 3:
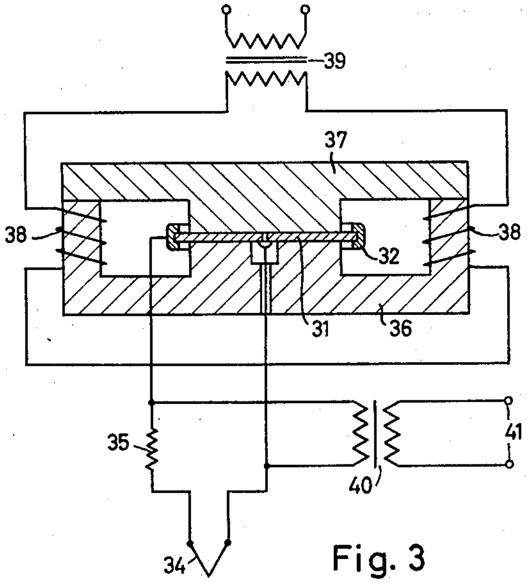
Fig. 3 illustrates a modification of a variable-resistance modulator.
Figure 4:
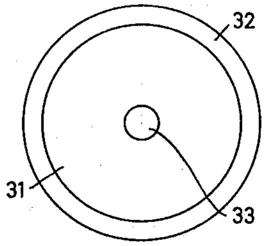
Fig. 4 is a top view of the semiconductor member used in the modulator of Fig. 3.

According to Figs. 3 and 4 the semiconductor member of the modulator consists of a disc 31 of one of the above-mentioned high mobility substances, such as InSb or InAs. The disc is provided with a peripheral electrode 32 of metal and with a centrally located point electrode 33. The two electrodes are connected to a source of modulating voltage, here consisting of a thermoelement 34, in series with an ohmic or inductive resistor 35. The member 31 has its central portion disposed between the pole faces of a magnet structure which is composed of an E shaped portion 36 and a T shaped cover portion 37. The windings 38 of the magnet system are connected to a transformer 39 which supplies alternating voltage of a given frequency. The output circuit of the modulator comprises a transformer 40 whose primary winding is connected across the electrodes 32 and 33 so as to be impressed by a variable voltage drop which depends upon the alternating field excitation of the magnet system and also upon the modulating voltage from source 34. The output voltage across terminals 41 of transformer 30 consists of an alternating voltage whose envelope curve corresponds to the modulating voltage variations originating from source 34.

It is generally of advantage to adapt the resistance of the semiconductor member in a modulator according to the invention to the internal resistance of the primary current or voltage source 8, 19, 34. For instance, if the primary source of direct current is a low-ohmic thermoelement, as exemplified in Figs. 1 and 3, then a semiconductor member of InSb is suitable because of the low specific resistance of this substance. On the other hand, if the primary current source has a high internal resistance as is the case for instance with a photocell as exemplified in Fig. 2, then the semiconductor member is preferably made in InAs because of its higher specific resistance. Generally suitable for primary current and voltage sources of low internal resistance are semiconductor substances which have a small width of the forbidden zone, while semiconductor substances having a large width of the forbidden zone are preferable for primary sources of large interior resistance, the width of the forbidden zone in germanium being taken as a standard of comparison. The use of semiconductor bodies with a larger width of the forbidden zone than germanium has the further advantage that the modulation is virtually independent of changes in temperature over a wide temperature range. This is particularly the case when the semiconductor used has pronounced extrinsic conductance, that is, consists of a lattice defect type semiconductor. With semiconductors of the latter type the temperature interdependence of the Hall effect and of the magnetically responsive change in resistance are particularly slight.

It will be understood by those skilled in the art that the invention permits of various embodiments, modifications and means other than those herein specifically described without departing from the essential features of the invention as set forth in the claims annexed hereto.

I claim:

1. An electric modulator for converting variable direct current into modulated alternating current, said electric modulator having a modulated power output of at least of the order of milliwatts, and being directly applicable to current amplifiers, electrodynamic oscillographs, magnetic amplifiers, transistor amplifiers and amplifying dynamos, and obviating the necessity of pre-amplifiers, said modulator comprising a magnetic field structure having a pole gap, magnetizing windings on said structure, a carrier-wave circuit connected to said windings, a disc-shaped single crystal resistance member disposed in said gap and consisting of InSb semiconducting compound, the resistance of said member being dependent upon the magnetic field, said member having a circumferentially extending terminal and a central terminal, a modulating direct current circuit having a current source and extending through said member between said terminals, and an output circuit connected across said terminals, said InSb compound being characterized by a high carrier mobility of at least about 10,000 $cm.^2$/volt second, the current source of the modulating current circuit having low resistance.

2. An electric modulator for converting variable direct current into modulated alternating current, said electric modulator having a modulated power output of at least of the order of milliwatts, and being directly applicable to current amplifiers, electrodynamic oscillographs, magnetic amplifiers, transistor amplifiers and amplifying dynamos, and obviating the necessity of pre-amplifiers, said modulator comprising a magnetic field structure having a pole gap, magnetizing windings on said structure, a carrier-wave circuit connected to said windings, a disc-shaped single crystal resistance member disposed in said gap and consisting of InSb semiconducting compound, the resistance of said member being dependent upon the magnetic field, said member having a circumferentially extending terminal and a central terminal, a modulating direct current circuit having a current source and extending through said member between said terminals, and an output circuit connected across said terminals, said InSb compound being characterized by a high carrier mobility of at least about 10,000 $cm.^2$/volt second, the current source of the modulating current circuit being a low-ohmic thermoelement.

3. An electric modulator for converting variable direct current into modulated alternating current, said electric modulator having a modulated power output of at least of the order of milliwatts, and being directly applicable to current amplifiers, electrodynamic oscillographs, magnetic amplifiers, transistor amplifiers and amplifying dynamos, and obviating the necessity of pre-amplifiers, said modulator comprising a magnetic field structure having a pole gap, magnetizing windings on said structure, a carrier-wave circuit connected to said windings, a disc-shaped single crystal resistance member disposed in said gap and consisting of InAs semiconducting compound having a minimum carrier mobility of about 10,000 $cm.^2$/volt second, said member having a circumferentially extending terminal and a central terminal, the resistance of said member being dependent upon the magnetic field, a modulating direct current circuit having a current source and extending through said member between said terminals, and an output circuit connected across said terminals, the current source of the modulating current circuit having high specific internal resistance.

4. An electric modulator for converting variable direct current into modulated alternating current, said electric modulator having a modulated power output of at least of the order of milliwatts, and being directly applicable to current amplifiers, electrodynamic oscillographs, magnetic amplifiers, transistor amplifiers and amplifying dynamos, and obviating the necessity of pre-amplifiers, said modulator comprising a magnetic field structure having a pole gap, magnetizing windings on said structure, a carrier-wave circuit connected to said windings, a disc-shaped single crystal resistance member disposed in said gap and consisting of InAs semiconducting compound having a minimum carrier mobility of about 10,000 cm.$^2$/volt second, said member having a circumferentially extending terminal and a central terminal, the resistance of said member being dependent upon the magnetic field, a modulating direct current circuit having a current source and extending through said member between said terminals, and an output circuit connected across said terminals, the current source of the modulating current circuit being a photocell.

5. An electric modulator for converting variable direct current into modulated alternating current, said electric modulator having a modulated power output of at least of the order of milliwatts, and being directly applicable to current amplifiers, electrodynamic oscillographs, magnetic amplifiers, transistor amplifiers and amplifying dynamos, and obviating the necessity of pre-amplifiers, said modulator comprising a magnetic field structure having a pole gap, magnetizing windings on said structure, a carrier-wave circuit connected to said windings, a disc-shaped crystalline semiconductor resistance member disposed in said gap, the member being a semiconducting compound having a minimum carrier mobility of about 20,000 cm.$^2$/volt second taken from the group consisting of InAs and InSb, said member having a peripheral wide area conductor terminal and a conductor terminal disposed inward radially, the resistance of said member being dependent upon the magnetic field, a modulating direct current circuit having a current source and extending in said member between said terminals, and an output circuit connected across said terminals.

6. The apparatus of claim 5, the semiconductor being a single crystal.

References Cited in the file of this patent

UNITED STATES PATENTS

| | | |
|---|---|---|
| 2,553,490 | Wallace | May 15, 1951 |
| 2,571,915 | McCoubrey | Oct. 16, 1951 |
| 2,702,316 | Friend | Feb. 15, 1955 |
| 2,713,150 | Bearinger | July 12, 1955 |
| 2,714,182 | Hewitt | July 26, 1955 |
| 2,719,253 | Willardson et al. | Sept. 27, 1955 |
| 2,778,802 | Willardson et al. | Jan. 22, 1957 |
| 2,813,817 | Leverenz | Nov. 19, 1957 |

OTHER REFERENCES

The Magnetoresistance Effect in InSb, by Pearson and Tennenbaum, The Physical Review, April 1, 1953, p. 153.

Article by H. Welker from "Zeitschrift für Naturforschung," vol. 7a, November 1952, pp. 744–749.